(12) United States Patent
Anderson

(10) Patent No.: US 7,916,898 B2
(45) Date of Patent: Mar. 29, 2011

(54) METHOD AND SYSTEM FOR IDENTIFYING AN EDGE OF A CROP

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 1053 days.

(21) Appl. No.: 10/978,046

(22) Filed: Oct. 29, 2004

(65) Prior Publication Data
US 2005/0088643 A1    Apr. 28, 2005

Related U.S. Application Data

(63) Continuation-in-part of application No. 10/662,865, filed on Sep. 15, 2003, now Pat. No. 6,839,127.

(51) Int. Cl.
| | |
|---|---|
| G06K 9/00 | (2006.01) |
| G02B 26/00 | (2006.01) |
| H04N 7/18 | (2006.01) |
| G01C 3/08 | (2006.01) |
| G05B 19/18 | (2006.01) |
| G06F 19/00 | (2006.01) |
| G05D 1/02 | (2006.01) |

(52) U.S. Cl. ........ 382/104; 382/103; 382/106; 382/110; 382/153; 382/154; 250/334; 348/120; 356/3.1; 356/5.01; 700/253; 700/269; 701/28; 701/50; 701/223; 701/300

(58) Field of Classification Search .................. 382/110, 382/154, 103, 104, 106, 153; 348/120, 118, 348/119; 701/50, 23, 26, 28, 41, 207, 223, 701/300, 301, 302; 356/5.04, 3.01–3.09, 356/3.1, 3.11, 3.12, 11, 6.3, 6.4, 606, 607; 340/437; 901/47; 56/10.1, 10.2 R, 10.2 D, 56/10.2 E, 10.2 F; 89/41.06, 41.07, 41.08; 235/411, 412, 413, 414, 415, 416; 250/332, 250/334; 700/251, 252, 253, 255, 258, 259
See application file for complete search history.

(56) References Cited

U.S. PATENT DOCUMENTS 3,749,493 A * 7/1973 Macovski .................... 356/2
(Continued)

FOREIGN PATENT DOCUMENTS

DE    24 55 836 A1    12/1976
(Continued)

OTHER PUBLICATIONS

Aufrere, R.; Mertz, C.; Thorpe, C., Multiple sensor fusion for detecting location of curbs, walls, and barriers, Jun. 9-11, 2003, IEEE, Intelligent Vehicles Symposium 2003. Proceedings, pp. 126-131.*
Aufrere, R.; Gowdy, J.; Mertz, C.; Thorpe, C.; Wang, C.; Yata, T., Perception for collision avoidance and autonomous driving, Dec. 2003, Mechatronics, vol. 13, No. 10, pp. 1149-1161.*
Chen, F.; Brown, G.; Song, M.; Overview of three-dimensional shape measurement using optical methods, 2000, Opt. Eng., vol. 39, Issue 1, pp. 10-22.*
Ruffin, P. Optical MEMS-Based Arrays. Proceedings of the SPIE, vol. 5055, pp. 230-241, 2003.

(Continued)

Primary Examiner — Vu Le
Assistant Examiner — Anthony Mackowey

(57) ABSTRACT

A method and system for identifying an edge of a crop facilitates guidance of an agricultural machine or other work vehicle along an edge of a crop at an interface between harvested and unharvested portions of a field. A transmitter emits a plurality of a transmitted radiation pattern of one or more generally linear beams spaced apart within a defined spatial zone. A receiver collects an image of the defined spatial zone. A detector detects a presence of crop edge between a harvested and unharvested portion of a field based on an observed illumination radiation pattern on the unharvested portion formed by at least one of the generally linear beams. A data processor identifies coordinate data, in the collected image, associated with the detected crop edge.

31 Claims, 9 Drawing Sheets

U.S. PATENT DOCUMENTS

| | | | | |
|---|---|---|---|---|
| 3,814,521 A * | 6/1974 | Free | ............. | 356/604 |
| 4,077,488 A * | 3/1978 | Bennett et al. | ............. | 180/169 |
| 4,239,388 A * | 12/1980 | Green | ............. | 356/4.01 |
| 4,412,121 A * | 10/1983 | Kremers et al. | ......... | 219/124.34 |
| 4,572,625 A | 2/1986 | Arndt et al. | ............. | 350/541 |
| 4,573,773 A | 3/1986 | Arndt et al. | ............. | 350/541 |
| 4,616,121 A * | 10/1986 | Clocksin et al. | ......... | 219/124.34 |
| 4,627,734 A * | 12/1986 | Rioux | ............. | 356/607 |
| 4,653,104 A * | 3/1987 | Tamura | ............. | 382/154 |
| 4,687,326 A * | 8/1987 | Corby, Jr. | ............. | 356/5.01 |
| 4,690,550 A | 9/1987 | Kühne | ............. | 356/5 |
| 4,701,047 A * | 10/1987 | Eibert et al. | ............. | 356/3.07 |
| 4,769,700 A | 9/1988 | Pryor | ............. | 348/120 |
| 4,781,465 A * | 11/1988 | Demachi et al. | ............. | 356/602 |
| 4,796,998 A * | 1/1989 | Soma et al. | ............. | 356/608 |
| 4,843,287 A * | 6/1989 | Taft | ............. | 318/568.16 |
| 4,868,752 A * | 9/1989 | Fujii et al. | ............. | 701/28 |
| 4,948,258 A * | 8/1990 | Caimi | ............. | 356/603 |
| 4,954,962 A * | 9/1990 | Evans et al. | ............. | 701/28 |
| 4,979,815 A * | 12/1990 | Tsikos | ............. | 356/3.06 |
| 5,022,723 A | 6/1991 | Schmidt et al. | ............. | 350/1.2 |
| 5,061,049 A | 10/1991 | Hornbeck | ............. | 359/224 |
| 5,074,673 A * | 12/1991 | Sowell et al. | ............. | 356/5.01 |
| 5,079,706 A * | 1/1992 | Yamaguchi et al. | ............. | 701/23 |
| 5,102,223 A * | 4/1992 | Uesugi et al. | ............. | 356/607 |
| 5,128,874 A * | 7/1992 | Bhanu et al. | ............. | 701/301 |
| 5,155,775 A * | 10/1992 | Brown | ............. | 382/153 |
| 5,220,164 A * | 6/1993 | Lieber et al. | ............. | 250/214 VT |
| 5,331,566 A * | 7/1994 | Kashima | ............. | 700/187 |
| 5,471,541 A * | 11/1995 | Burtnyk et al. | ............. | 382/153 |
| 5,509,486 A * | 4/1996 | Anderson | ............. | 172/6 |
| 5,528,354 A | 6/1996 | Uwira | ............. | 356/5.01 |
| 5,589,942 A * | 12/1996 | Gordon | ............. | 356/611 |
| 5,600,478 A | 2/1997 | Stevens | ............. | 359/223 |
| 5,621,529 A * | 4/1997 | Gordon et al. | ............. | 356/604 |
| 5,694,751 A | 12/1997 | Behnke | ............. | 56/10.2 |
| 5,715,665 A | 2/1998 | Diekhans et al. | ............. | 56/10.2 F |
| 5,715,666 A | 2/1998 | Huster et al. | ............. | 56/10.2 |
| 5,870,176 A | 2/1999 | Sweatt et al. | ............. | 355/53 |
| 5,875,408 A * | 2/1999 | Bendett et al. | ............. | 701/28 |
| 5,911,669 A * | 6/1999 | Stentz et al. | ............. | 56/10.2 F |
| 5,933,183 A | 8/1999 | Enomoto et al. | ............. | 347/241 |
| 5,966,230 A | 10/1999 | Swartz et al. | ............. | 359/196 |
| 5,995,650 A * | 11/1999 | Migdal et al. | ............. | 382/154 |
| 6,031,605 A | 2/2000 | Olbertz | ............. | 356/141.4 |
| 6,059,188 A | 5/2000 | diFazio et al. | ............. | 235/462.36 |
| 6,069,727 A | 5/2000 | Cho et al. | ............. | 359/226 |
| 6,095,254 A | 8/2000 | Homburg | ............. | 172/6 |
| 6,101,795 A | 8/2000 | Diekhans | ............. | 56/10.2 F |
| 6,128,574 A | 10/2000 | Diekhans | ............. | 701/209 |
| 6,188,500 B1 | 2/2001 | Rudeen et al. | ............. | 359/196 |
| 6,244,024 B1 | 6/2001 | Diekhans et al. | ............. | 56/10.2 F |
| 6,285,778 B1 * | 9/2001 | Nakajima et al. | ............. | 382/104 |
| 6,359,718 B1 | 3/2002 | Lin et al. | ............. | 359/224 |
| 6,389,785 B1 | 5/2002 | Diekhans et al. | ............. | 56/10.2 |
| 6,392,747 B1 * | 5/2002 | Allen et al. | ............. | 356/141.1 |
| 6,397,569 B1 | 6/2002 | Homburg et al. | ............. | 56/10.2 |
| 6,452,684 B1 * | 9/2002 | Mennink | ............. | 356/601 |
| 6,529,627 B1 * | 3/2003 | Callari et al. | ............. | 382/154 |
| 6,615,570 B2 * | 9/2003 | Beck et al. | ............. | 56/10.2 E |
| 6,661,524 B2 * | 12/2003 | Smith et al. | ............. | 356/614 |
| 6,674,534 B2 * | 1/2004 | Norita et al. | ............. | 356/601 |
| 6,697,724 B2 * | 2/2004 | Beck | ............. | 701/50 |
| 6,714,662 B1 * | 3/2004 | Benson et al. | ............. | 382/104 |
| 6,754,370 B1 * | 6/2004 | Hall-Holt et al. | ............. | 382/106 |
| 6,826,894 B2 * | 12/2004 | Thiemann et al. | ............. | 56/10.2 E |
| 6,847,392 B1 * | 1/2005 | House | ............. | 348/36 |
| 6,853,458 B2 * | 2/2005 | Yahashi et al. | ............. | 356/604 |
| 6,864,965 B2 * | 3/2005 | DeFlumere | ............. | 356/4.01 |
| 6,868,194 B2 * | 3/2005 | Tu et al. | ............. | 382/312 |
| 6,961,443 B2 * | 11/2005 | Mahbub | ............. | 382/100 |
| 6,965,690 B2 * | 11/2005 | Matsumoto | ............. | 382/154 |
| 7,064,810 B2 | 6/2006 | Anderson et al. | | |
| 7,206,063 B2 | 4/2007 | Anderson et al. | | |
| 7,248,344 B2 * | 7/2007 | Morcom | ............. | 356/10 |
| 7,302,109 B2 * | 11/2007 | Hu et al. | ............. | 382/260 |
| 7,310,431 B2 * | 12/2007 | Gokturk et al. | ............. | 382/103 |
| 2002/0018219 A1 * | 2/2002 | Hallerman et al. | ............. | 356/604 |
| 2003/0145571 A1 | 8/2003 | Diekhans | ............. | 56/10.2 R |
| 2004/0056182 A1 * | 3/2004 | Jamieson et al. | ............. | 250/221 |
| 2004/0066500 A1 * | 4/2004 | Gokturk et al. | ............. | 356/4.01 |
| 2005/0088643 A1 | 4/2005 | Anderson | ............. | 356/5.01 |

FOREIGN PATENT DOCUMENTS

| | | |
|---|---|---|
| EP | 0 887 660 A2 | 12/1998 |
| EP | 1 221 582 A2 | 7/2002 |
| EP | 1 321 777 A2 | 6/2003 |

OTHER PUBLICATIONS

Fainman, Y.; Botvinick, E.; Price, J.; Gough, D. 3-D Quantitative Imaging of the Microvasculature with the Texas Instruments Digital Micromirror Device. Proceedings of the SPIE, vol. 4457, pp. 137-144, 2001.

Anagnostopoulos, G.P.; Wagner, B.; Papageorgas, P.G.; Hofmann, U.; Maroulis, D.; Theofanous, N.G. The Electronics of a Control System for Micromirrors in a Laser-Scanning Device. IEEE. ISBN: 0-7803-7596-3, pp. 1207-1210, 2002.

Products Overveiw, Laser Measurement Systems-Outdoor [online] sick [retrieved on Nov. 30, 2001]>Retrieved from the Internet: <URL: http://www.sick.de/english/products/dat_products.asp?bannerback=0>.

Freudenrich, C.C. "How Projection Television Works" [online] [retrieved on Jan. 29, 2002]. Retrieved from the Internet: <URL: http://www.howstuffworks.com/projection-tv4.html>.

Riegl USA Scanners & Rangefinders for Surveying, Altimetry and other applications [online] Riegl USA [retrieved] on Nov. 30, 2001]. Retrieved from the Internet: <URL: http://www.rieglusa.com/LMS-Z210.html>.

* cited by examiner

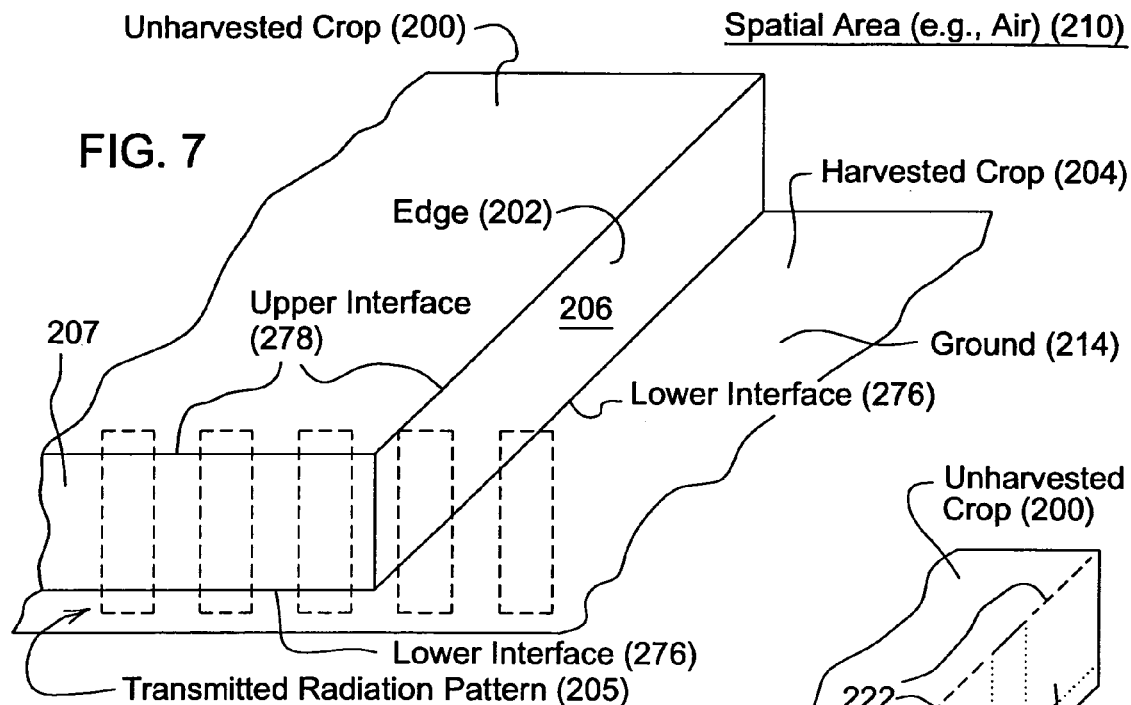
FIG. 7
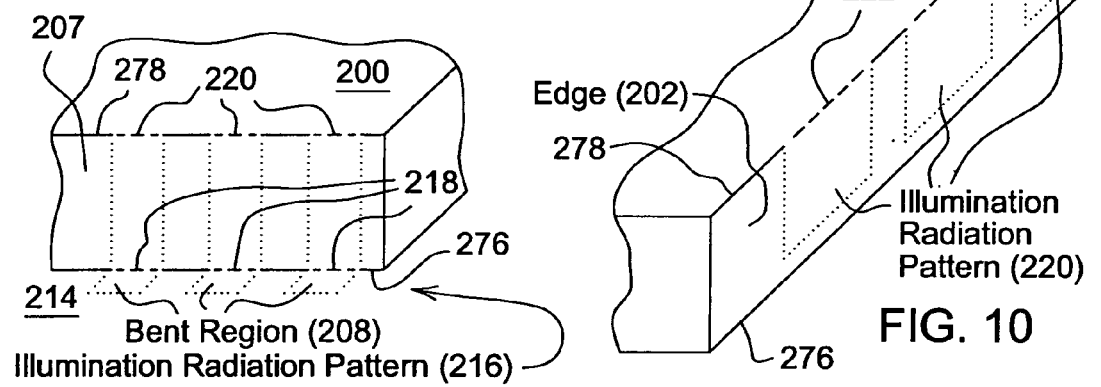
FIG. 8
FIG. 10
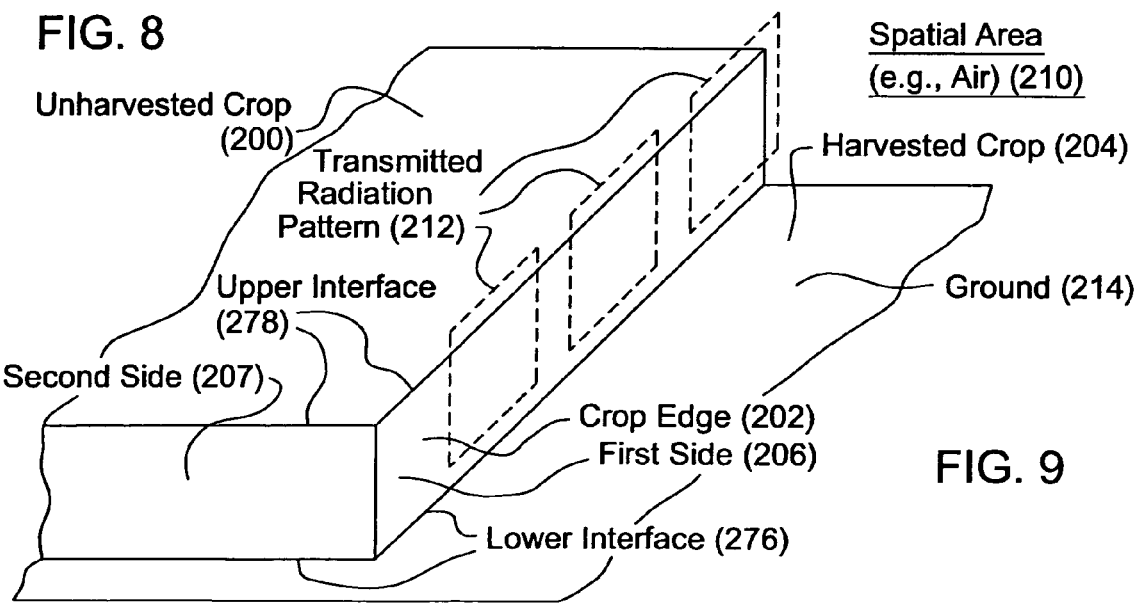
FIG. 9

METHOD AND SYSTEM FOR IDENTIFYING AN EDGE OF A CROP

This is a continuation-in-part of U.S. application Ser. No. 10/662,865, filed Sep. 15, 2003, now U.S. Pat. No. 6,839,127 and entitled OPTICAL RANGE FINDER HAVING A MICRO-MIRROR ARRAY.

FIELD OF THE INVENTION

This invention relates to a method and system for identifying an edge of a crop for guidance of an agricultural machine or another work vehicle.

BACKGROUND OF THE INVENTION

A work vehicle may comprise a combine, a harvester or another work vehicle for harvesting a crop. As crop is harvested, a boundary or edge is formed between the harvested and unharvested crop. The edge may form a generally linear path or a contour that is parallel to previous swaths of the work vehicle in the field, for example. Although a work vehicle may be guided with a location-determining receiver (e.g., a Global Positioning System (GPS) receiver with differential correction), accurate location data to a desired degree of precision may be temporarily unavailable because of propagation problems (e.g., tree canopies) or other technical difficulties. Further, some work vehicles may not be equipped with location-determining receivers that provide location data. For the foregoing reasons, there is a need for a method and system for identifying an edge of crop for guidance of an agricultural machine or other work vehicle.

SUMMARY OF THE INVENTION

A method and system for identifying a crop edge of a crop facilitates guidance of an agricultural machine or other work vehicle along the crop edge at an interface between harvested and unharvested portions of a field. A transmitter emits a transmitted radiation pattern within a defined spatial zone. A receiver collects an image of the defined spatial zone. A detector detects a presence of the crop edge between a harvested and unharvested portion of a field based on an observed illumination radiation pattern on an unharvested portion. A data processor identifies coordinate data, in the collected image, associated with the detected crop edge.

BRIEF DESCRIPTION OF THE DRAWING

FIG. 7 is a perspective view of a field showing a portion of a crop near an edge illuminated with a transmitted radiation pattern of strips or generally linear components.

FIG. 8 shows a received reflection or an illumination radiation pattern based on the transmitted radiation pattern of FIG. 7.

FIG. 9 shows a perspective view of a field showing a portion of crop near an edge illuminated with a transmitted radiation pattern (e.g., structured light).

FIG. 10 shows a received reflection or an illumination radiation pattern based on the transmitted radiation pattern of FIG. 9.

DESCRIPTION OF THE PREFERRED EMBODIMENTS

A crop edge may be defined by a group of points, segments or arcs that are interconnected. The crop edge may be defined in two dimensions or three dimensions. The crop edge may be defined by points, segments or arcs that lie on the ground or corresponding coordinates for such points, segments, or arcs. The crop edge may also be defined by a three-dimensional "wall" that is bound by an upper interface and a lower interface. Upper critical points lie on the upper interface, whereas lower critical points lie on the lower interface. Critical points shall refer to upper critical points, lower critical points, or both. Critical points may be expressed in three dimensional coordinates (e.g., Cartesian coordinates).

Figure 1:
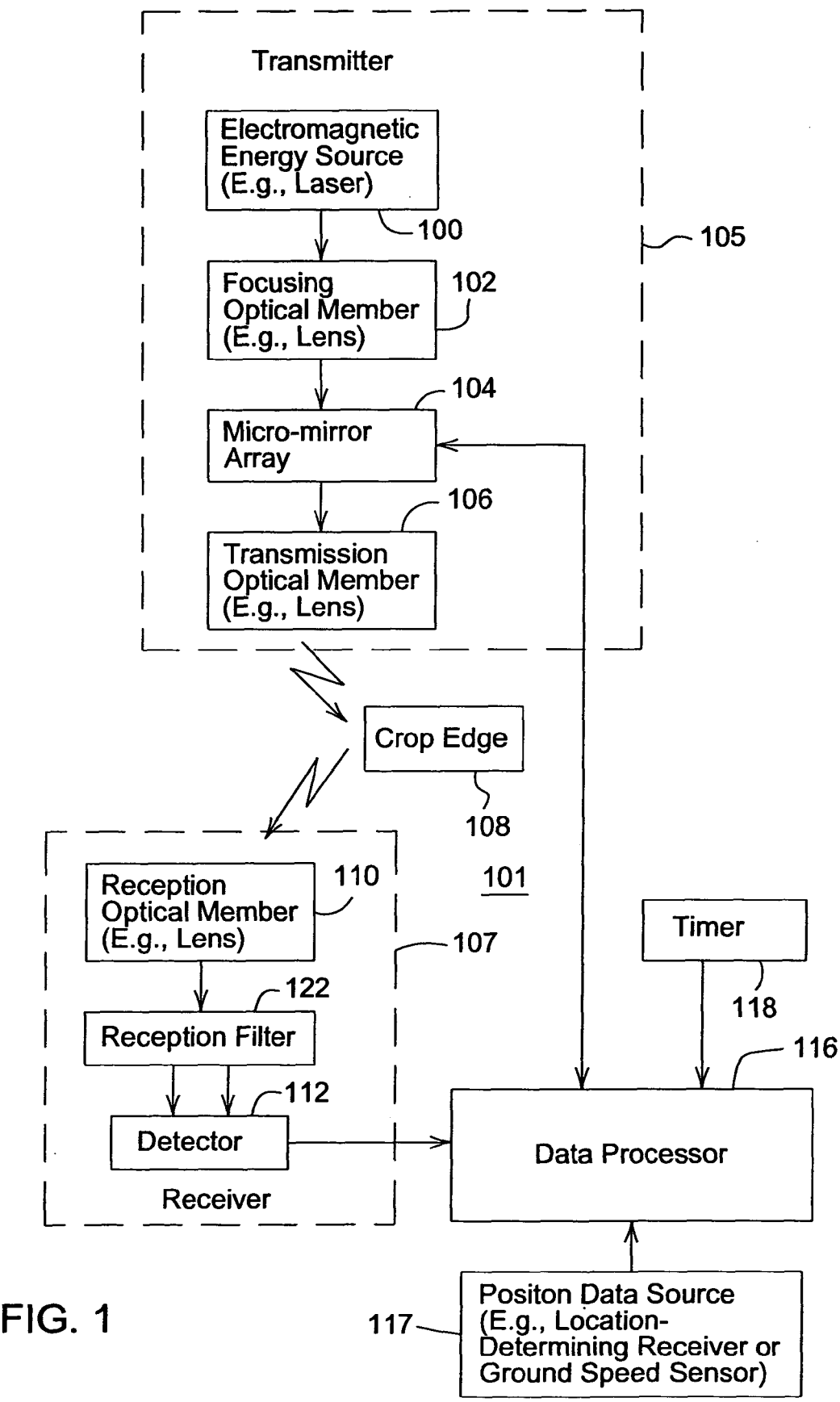
FIG. 1 is a block diagram of a system for identifying a crop edge in accordance with the invention.

FIG. 1 shows a block diagram of an edge identification system 101 for determining location data or coordinates of an crop edge with respect to a reference point. The reference point may be defined with reference to the edge identification system 101 or a portion thereof. The edge identification system 101 comprises a transmitter 105, a receiver 107, a data processor 116, a position data source 117, and a timer 118. The transmitter 105 transmits an electromagnetic signal (e.g., a pulse, a pulse train or structured light) from the edge identification system 101 toward an crop edge 108. The receiver 107 receives the reflected electromagnetic signal (if any) at the edge identification system 101.

In one embodiment, the transmitter 105 comprises an electromagnetic energy source 100, a focusing optical member 102, a micro-mirror array 104, and a transmission optical member 106. The receiver 107 (e.g., camera) comprises a reception optical member 110, a reception filter 122 and a detector 112. The reception optical member 110 refers to a lens, an optical member, or another device for receiving the transmitted electromagnetic signal. The detector 112 may comprise a charge-coupled device (CCD) for collecting an image associated with the crop edge 108, for example.

The electromagnetic energy source 100 (e.g., a laser) emits electromagnetic radiation (e.g., an infrared beam, near infrared, ultraviolet, red light, a visual spectrum beam or another light beam) toward a focusing optical member 102 (e.g., a lens). In one embodiment, the electromagnetic energy source 100 comprises a laser with an output power that is considered safe by U.S. and international standards.

The focusing optical member 102 focuses the electromagnetic radiation upon a micro-mirror array 104. The focusing member 102 may form the beam into a columnar shape, or another desired shape and alignment for incidence upon the micro-mirror array 104. A data processor 116 controls the micro-mirror array 104 to direct the focused electromagnetic radiation (e.g., linear beam) in a defined direction (e.g., a range-finding mode) or a defined radiation pattern (e.g., structured light pattern). A transmission optical member 106 focuses the defined radiation pattern toward a crop edge.

In an alternate embodiment, a transmission filter (e.g., intensity filter) may be positioned in the light path between the focusing optical member 102 and the micro-mirror array 104. The transmission filter may represent a liquid crystal display or a disk with various levels of transparency to control intensity of the transmitted light. The intensity may be diminished to maintain eye-safe output levels.

A reception optical member 110 receives electromagnetic radiation reflected from the crop edge 108 or that illuminates a portion of the crop edge 108. The reception filter 122 may filter the received electromagnetic radiation at a reception frequency to coincide with the transmission frequency of the electromagnetic energy source 100. The detector 112 detects the receipt of the reflected electromagnetic radiation. For example, the detector 112 generates a detection signal proportional to the intensity of the received beam reflection.

In one embodiment, the receiver 107 comprises one or more cameras that receive ambient light and/or reflected light from the transmitter 105 in the field of interest. The camera may be equipped with pan, tilt or zoom capability to adjust the field of interest to encompass the crop edge.

The edge detection system 101 may operate in a range finding mode or a structured-light mode, or both. The micro-mirror array 104 supports transmission in the structured light mode and the range-finding mode. In the range finding mode, a timer 118 determines an elapsed time between transmission of electromagnetic radiation (e.g., an identifiable pulse at a transmission time) to the crop edge and receipt of the electromagnetic radiation (e.g., a reflection of the identifiable pulse at a reception time) from the crop edge. The elapsed time between when the beam or pulse leaves the transmitter 105 at a transmission time and when its reflection returns at the reception time is used to determine the distance between the edge identification system 101 and the crop edge 108. A data processor 116 converts the elapsed time into a distance between the crop edge and a reference point associated with the edge identification system 101. The distance (D) in meters to the crop edge or another point of the reflection is equal to the elapsed time (T) in seconds, divided by two and multiplied by the speed of light (C) in meters per second. That is, $D=TC/2$.

In the range-finding mode, the system 101 transmits a point of light or a concentrated directional radiation pattern in one or more pulses. The range-finding mode may use time-of-propagation from the transmission time of the transmitted pulse to the corresponding reception time of the received reflection pulse to estimate a range, depth, or three-dimensional coordinate for a point (e.g., a critical point) associated with the crop edge. The system 101 may apply the structured light mode to identify critical points in an image and the range-finding mode to identify the coordinates, depth data, or three dimensional coordinates for the identified critical points. The range-finding mode may be used to direct the attention of the radiation pattern at critical points identified in the structured-light mode to take detailed positional measurements.

In the structured light mode, the transmitter 105 transmits a defined radiation pattern of structured light. Structured light refers to the projection of a defined light pattern (e.g., a geometrical pattern) into a scene (e.g., against a crop edge or a crop). For short ranges (e.g., several meters), structured light may be used to extract three-dimensional information from a two-dimensional image. For longer ranges, structured light may be used to collect two-dimensional information about a scene. The transmitter 105 projects the structured light pattern from a transmitter position (e.g., x, y, z spatial coordinates) with known relative position and separation with respect to a receiver 107 at a receiver position (e.g., x, y and z spatial coordinates). The image coordinates of where the structured light illuminates or reflects from the crop or another object in the scene may be recorded. The image coordinates, transmitter position, and receiver position may be used to estimate or determine the real world coordinates of the crop edge 108 or a portion of the crop with geometric or trigonometric equations, for example.

In a structured light mode, the system 101 transmits a radiation pattern that comprises any of the following: a grid of points, a line segment, multiple line segments, a grid of line segments, an illuminated region, and a illuminated trapezoidal region, an illuminated rectangular region, and a variable pattern. The structured light radiation pattern may be used to scan the crop edge in accordance with a variable scanning pattern, a fixed scanning pattern, a scanning pattern, a zoned scanning pattern, or a random access scanning pattern, for example. In contrast, the a mechanical scanning, no fixed scanning order or sequence is required with the micro-mirror array 104. The radiation pattern may be moved and projected along the crop edge in a continuous or discontinuous manner to cover a large area quickly. Advantageously, the scanning pattern in the structured light mode may be shifted to look up-field rapidly where a discontinuity is identified to avoid disruptions or inaccuracy in guidance that might be caused by one or more discontinuities in the crop edge.

The receiver 107 observes the interaction or distortion of the structured light when it strikes or illuminates the crop edge. This observed interaction or distortion of the structured light with the crop edge may be referred to as an illumination radiation pattern. The illumination radiation pattern facilitates identification of critical points at the upper interface (e.g., a top of the crop edge) and a lower interface (e.g., a bottom of the crop edge near or at the crop-ground interface).

The coordinate system of the two modes are registered to one another and the coordinate systems are aligned spatially (or spatially and temporally) by considering vehicular movement (e.g., velocity and acceleration) and relative displacement. A position data source 117 may provide vehicular speed (and possibly heading) of the vehicle to facilitate registration or geometric alignment of multiple images taken in sequence or a first image position of a first image in the structured light mode and a second image position of a second image in the range finding mode. The position data source 117 may comprise a location determining receiver or ground speed vehicle sensor. A timer 118 or clock may facilitate associating a time-stamp with each image to facilitate alignment of the registration of the images.

The micro-mirror array 104 supports transmission in the structured light mode and the range-finding mode as follows: The micro-mirror array 104 comprises arrays of reflective members associated with a substrate. Reflective members may be energized individually or in sequence to scan over a desired area (e.g., field of view). Each reflective member may be energized via one or more capacitive plates or conductive members to deform, and hence, steer the reflective member. More than one mirror may reflect the light at one time, resulting in a larger beam than if just a single mirror reflected the beam. Accordingly, the output beam size, intensity or both may be dynamically adjusted to form structured light in the structured light mode or a narrow beam in the range finding mode. The aggregate radiation pattern of the beam from the micro-mirror array 104 may represent any of the following: a series of generally linear segments or strips, a trapezoidal radiation pattern, a rectangular radiation pattern, a structured light radiation pattern, a generally conical beam, a generally cylindrical beam, a generally circular beam, a point, and a range-finding radiation pattern. Advantageously, the edge identification system 101 can provide a smooth scan line or greater resolution scan line by changing a fraction of the asserted mirrors comprising the beam. The micro-mirror array 104 allows a user to randomly activate different elements, rather than scanning in a particular sequence, as might be required with mechanical laser scanners. Adjustments to the beam may be accomplished dynamically without any limitation from the rotation rate of a multi-sided mechanical mirror of prior art systems.

In one embodiment, elastomers are added between the reflective member and the substrate to decrease the response time from deformation to rest after the energy is removed from a member. The elastomer associated with the reflective elements may be used to improve the range of motion of the reflective elements, which in turn, improves the angular scan range. The elastomer associated with the reflective elements may lower the energy or voltage needed to control the micro-mirror array 104. Micro-mirror arrays may be fabricated by semiconductor and integrated circuit fabrication techniques. Features of micro-mirror arrays may be constructed of one or more of the following: silicon, silicon oxide, silicon nitride, aluminum, silver, and nickel.

The micro-mirror array 104 may comprise a micro-electromechanical system (MEMS), a compliant micro-electromechanical system (CMEMS) or another device. The tilt or movement of the mirror are controlled by electrostatic charges applied to electrodes. Semi-conductor switches, such as complementary metal oxide semiconductor (CMOS) transistors, may be used to control the position of the mirrors by electrostatic deflection and sense the position of the mirrors by capacitive sensing.

A micro-mirror array 104 may be energized to project a line segment, a group of generally parallel line segments, a strip, a group of generally parallel strips, a linear arrangement of pixels or other patterns of structured light. A micro-mirror array 104 may be energized to provide pulses of light or emissions in a narrow beam radiation pattern (e.g., circular, cylindrical or conical), where time of flight is measured from a reflective obstacle. The micro-mirror array 104 comprises a micro-electromechanical device that supports the output of a randomly accessible beam position and a variable beam size. The micro-mirror array 104 allows great flexibility in range data collection with the potential to greatly increase efficiency of data collection. For example, a structured light pattern can be used to identify image critical points (e.g., x, y image coordinates or x, y image coordinate ranges) where crop edges of potential interest lie in a region within a field of view or the field of view extending forward from the vehicle on one or both sides. A pulse or narrow beam can then be used to gather detailed range or distance data (e.g., z data or x, y and z coordinates) for the real world critical points corresponding to the image critical points. There can be significant data collection efficiency improvements by the transmitter 105 first transmitting a structured light pattern to estimate raw critical point locations of the crop edge followed by subsequent gathering of detailed time of propagation measurements to confirm definite physical world point locations of crop edges or critical points lying thereon. Instead of processing an entire field of view or an extensive portion of the field of view, the data processor 116 can limit processing to a defined spatial area found by estimate of raw critical point ranges rather than completing a potentially time-consuming time-of-propagation analysis over the entire field of view.

Figure 2:
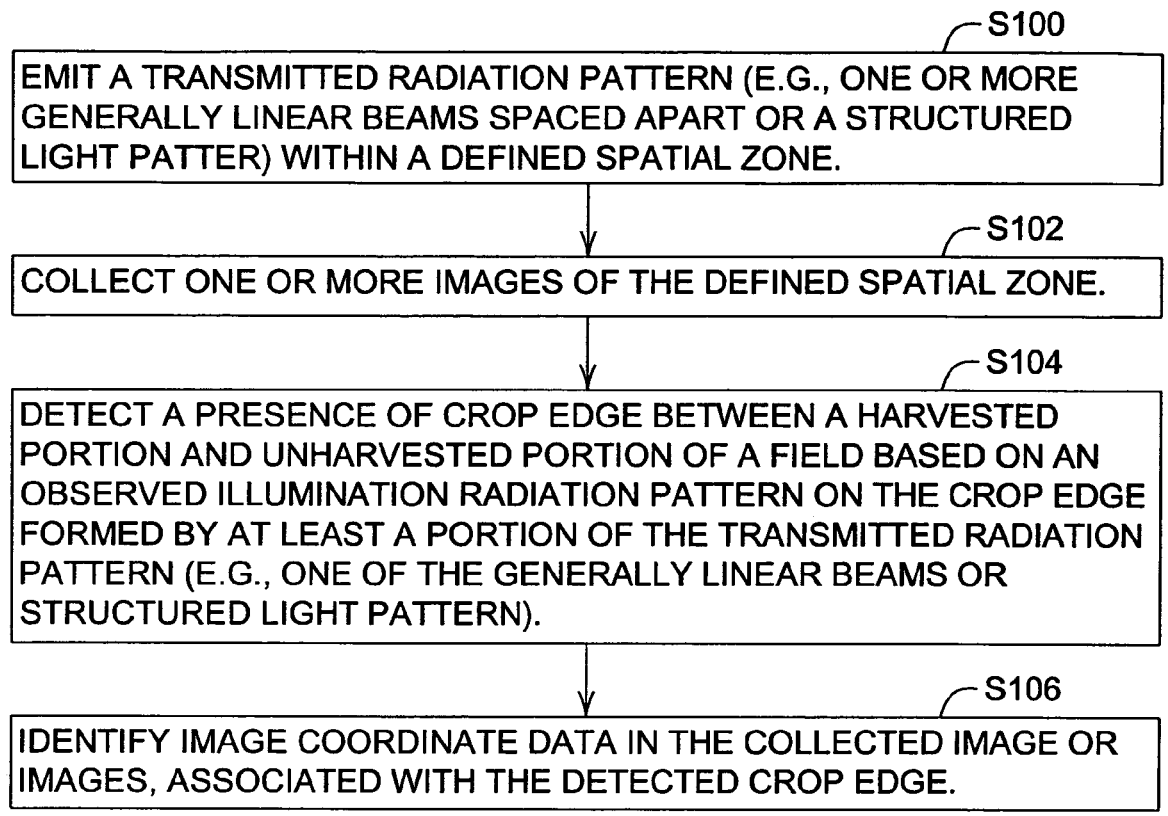
FIG. 2 is an embodiment of a method for identifying a crop edge in accordance with a structured light mode.

FIG. 2 is a flow chart of a method for identifying a crop edge in a field. The method of FIG. 2 begins in step S100.

In step S100, a transmitter 105 emits a transmitted radiation pattern (e.g., a structured light radiation pattern in a structured light mode) within a defined spatial zone. Step S100 may be carried out in accordance with various techniques, that may be applied alternatively or cumulatively. In accordance with a first technique, the transmitter 105 emits a radiation pattern that comprises generally linear beams (or generally rectilinear strips) in a direction of travel in front of the work vehicle. Under a second technique, the transmitter 105 emits a radiation pattern that comprises generally linear beams (or generally rectilinear strips) spaced apart and arranged in a generally vertical manner. Under a third technique, the transmitted radiation pattern comprises one or more linear beams (or generally rectilinear strips) with its or their longitudinal axes oriented vertically and generally parallel to a side of the crop edge. Under a fourth technique, the transmitted radiation pattern comprises any structured light radiation pattern, including geometric shapes (e.g., rectangles and trapezoids). The micro-mirror array 104 supports the formation of the generally rectangular or trapezoidal radiation pattern by aligning the reflective elements of the micro-mirror array 104 to produce a desired radiation pattern (e.g., through constructive interference or additive phase relationships). Under a fifth technique, the transmitter may transmit beams with different frequency range content, such as strips of different colors or line segments of different colors to better distinguish the effects of reflection or illumination of the crop edge. Under a sixth technique, the transmitted radiation pattern is directed toward a side of crop edge, where the defined spatial zone comprises an unharvested portion of the crop and air above the unharvested portion.

The defined spatial zone comprises a region that contains one or more of the following: (1) a harvested portion and an unharvested portion of the crop, (2) an upper interface between a top of the unharvested crop and a spatial region (e.g., air space) above the unharvested crop, (3) a lower interface between the unharvested crop and the ground, (4) a lower interface between the unharvested crop and harvested crop (e.g., crop stubble), (5) a crop edge, and (6) a region around the crop edge. In one embodiment, the transmission is directed toward the crop edge or in a region around the crop edge to reduce the time and processing burden on the data processor. The transmitter 105 does not need to scan the entire field of view because the micro-mirror array 104 supports random access to any available radiation pattern and orientation thereof so that the defined spatial zone may be scanned with a structured light pattern. The transmitter 105 may emit a radiation pattern toward (a) a bottom of the crop at the lower interface between the unharvested crop and the ground or harvested crop, (b) a top of the crop at an upper interface between the unharvested crop and the spatial region (e.g., air), or (c) both the bottom and the top interface regions of the crop. If scanning is completed both at the top and bottom of the crop of the crop edge, the greatest accuracy and resolution is achieved. Further, such scanning is well-suited for developing a generally planar or three dimensional model of the crop edge.

In step S102, a receiver collects one or more images of the defined spatial zone. In one embodiment, step S104 involves taking multiple images of the same scene, defined spatial zone or crop edge. For example, the receiver 107 takes a first image when the electromagnetic energy source 100 is transmitting, whereas the receiver 107 takes a second image of the same spatial zone (e.g., scene) when the electromagnetic energy source 100 is off or not transmitting. Further, after registration or alignment of the first and second images, the second image is subtracted from the first image to leave the projection or illumination radiation pattern as a resultant image within the spatial zone.

If multiple images of the same scene are taken in step S102 the images may be aligned or registered by (1) considering areas of similar luminance or patches of similar color characteristics or (2) associating each image with real-time coordinates of the vehicle via the position data source 117 and the timer 118 and determining the actual change in position of the vehicle between images versus time. Although depth information (e.g., three dimensional information) may be extracted from multiple images of the same scene taken at different spatially separated points or from simultaneous stereo images, two-dimensional information on the crop edge is readily available without complex or processor-intensive computations.

In step S104, the data processor 116 detects a presence of a crop edge between a harvested portion and unharvested portion of a field based on an observed illumination radiation pattern (e.g., a reflective transition) on the crop edge formed by at least a portion of the transmitted radiation pattern transmitted in step S100. An upper interface or critical point (e.g., an upper critical point) of the unharvested crop is indicated by the transition between (1) a first region of no observable reflection or no projection of an illuminated image on the crop (adjacent to the illuminated portion of the crop) from the transmitted radiation pattern and (2) a second region associated with a reflection or illuminated portion of the crop. The first region and the second region are adjacent to one another. Provided that strips or generally linear components are transmitted, a lower interface or critical point of the unharvested crop is indicated by an inflection point of a reflection, a bent linear segment, an inflection point of a bent linear segment, or observed illumination radiation pattern. In particular, the transmitter 105 transmits a straight generally linear segment and if a bent linear segment is observed as a reflection or observed illumination, then the bent linear segment indicates the location of the lower interface (e.g., the crop-ground interface) or critical points (e.g., lower critical points) lying thereon.

In one embodiment where multiple generally parallel linear segments are transmitted in step S100, the data processor 116 processes the return image in step S104 to look for a gap in the return line spacing of the observed illumination radiation pattern. A gap in the return line spacing indicates where the top of the crop is no longer blocking the light and the light is able to proceed unreflected into the spatial area or into the crop. Whether the transmitted radiation pattern propagates into the spatial area above the crop or into the crop (or toward the ground) depends upon the relative orientation of the transmitted radiation pattern with respect to the crop and the angle of incidence of the transmitted radiation pattern on the various portions of the crop edge. The spacing between the lines parallel to the crop edge top could be used to identify the exact crop edge.

In step S106, the data processor 116 identifies image coordinate data in the collected image associated with the detected crop edge. For example, the data processor 116 may identify two dimensional coordinates within the image as the image coordinate data. The image coordinate data may correspond to estimates of location data for critical points associated with the top edge. The critical points may lie on the upper interface, the lower interface, or intermediate between the upper interface and the lower interface. The image coordinate data associated with the crop edge may be used to limit or define the defined spatial zone for subsequent selective gathering (e.g., in a range-finding mode) of depth or three-dimensional information in the region of the detected crop edge.

In an alternate embodiment, following step S106 the data processor 116 translates the image coordinate data to estimated real world coordinates. One example of real-world coordinates are those that are compliant with the WGS-84 standard (World Geodetic System 1984). WGS-84 provides a standard definition and conversion for WBS-84 local coordinates into a global reference frame or global coordinates. In one embodiment, the image coordinate data is translated to real world coordinate data by considering a transmitter position (e.g., in three dimensional coordinates) of the transmitter 105 and the receiver position (e.g., in three dimensional coordinates) of the receiver 107 and the angular orientation (e.g., lens orientation) of the transmitter 105 and the receiver 107. The transmitter position and the receiver position may determined with respect to the ground. Because of any sideways tilt and front-to-back tilt of the vehicle from local terrain may be the source of some error in translating image data coordinates to real world coordinates, range-finding or other techniques may be used to supplement the structured light mode of crop edge identification in the method of FIG. 2. The real world, two-dimensional coordinate data associated with the crop edge may be used to limit or define the defined spatial zone for selective gathering of depth or three-dimensional information in the region of the detected crop edge (e.g., via the range-finding mode of the system 101).

Figure 3:
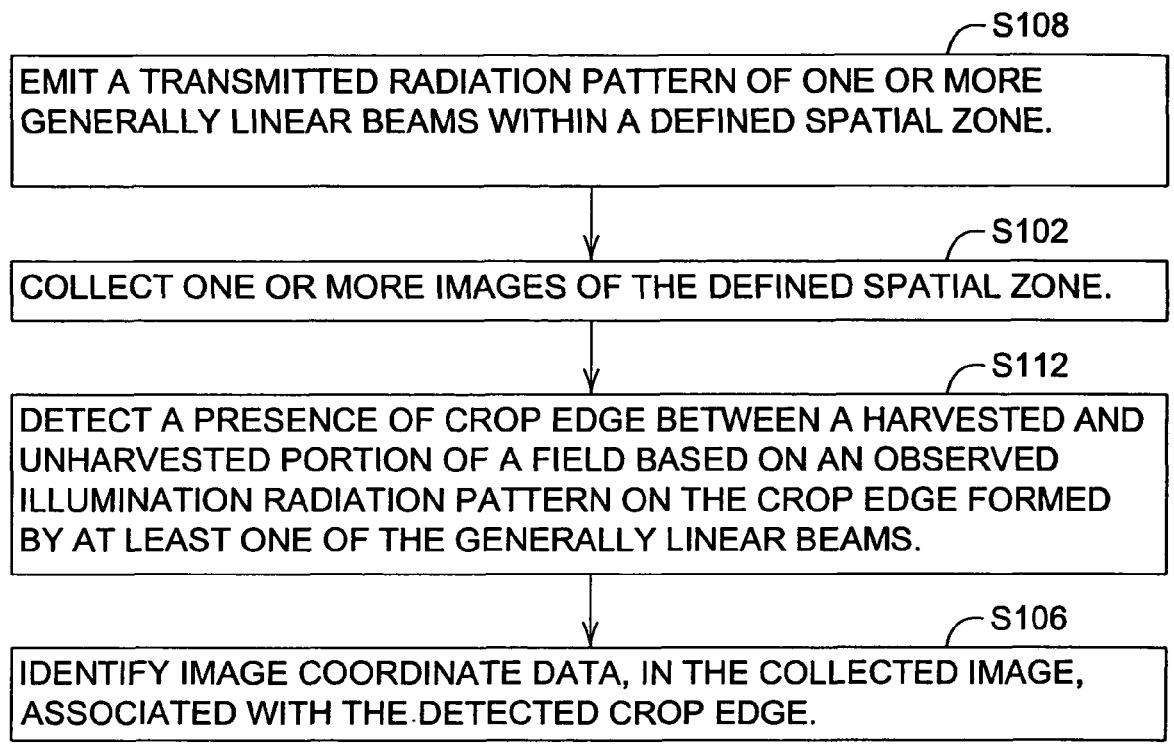
FIG. 3 is another embodiment of a method for identifying a crop edge in accordance with a structured light mode.

FIG. 3 is a flow chart of another method for identifying a crop edge in a field. The method of FIG. 3 is similar to the method of FIG. 2, except the method of FIG. 3 replaces steps S100 and S104, with steps S108 and S112, respectively. Like reference numbers in FIG. 2 and FIG. 3 indicate like procedures or steps. The method of FIG. 3 begins in step S108.

In step S108, a transmitter 105 emits a transmitted radiation pattern of one or more generally linear beams within a defined spatial zone. The transmission is directed toward the defined spatial zone, such as the crop edge or in a region around the crop edge to reduce the time and processing burden on the data processor 116. The transmitter 105 does not need to scan the entire field of view because the micro-mirror array 104 supports random access to any available radiation pattern and orientation thereof.

In one example, once initially identified critical points of the crop edge are identified, the subsequent direction of the transmitted radiation pattern in step S108 may be limited to regions consistent with the initially identified critical points. The initially identified critical points may be collected during an initial or earlier execution of the steps of FIG. 3, whereas the subsequent direction of transmitted radiation pattern is realized during a later execution of this step S108 of FIG. 3 following the initial or earlier execution.

In step S102, a receiver 107 collects one or more images of the defined spatial zone. Step S102 is more fully described in conjunction with the method FIG. 2 and the same description applies equally to FIG. 3, as if fully set forth here.

In step S112, a data processor 116 detects a presence of a crop edge between a harvested and unharvested portion of a field based on an observed illumination radiation pattern on the crop edge formed by at least one of the generally linear beams. An upper interface or critical point of the unharvested crop is indicated by the transition between (1) the first region of no observable reflection or no projection of an illuminated image on the crop (adjacent to the illuminated portion of the crop) and (2) the second region associated with a reflection or illuminated portion of the crop. Because or the transmission of the linear beams in step S108, a lower interface or critical point of the unharvested crop is indicated by an inflection point of a reflection, a bent linear segment, an inflection point of a bent linear segment, or observed illumination radiation pattern. If the transmitter 105 transmits a straight generally linear segment and if a bent linear segment is observed as a reflection or observed illumination, then the bent linear segment indicates the location of the lower interface (e.g., the crop-ground interface) or critical points lying thereon.

In one embodiment where multiple generally parallel linear segments are transmitted in step S106, the data processor 116 processes the return image in step S112 to look for a gap in the return line spacing. A gap in the return line spacing indicates where the top of the crop is no longer blocking the light and the light is able to proceed unreflected into the spatial area above the crop or into the crop. Whether the transmitted radiation pattern propagates into the spatial area above the crop or into the crop (or toward the ground) depends upon the relative orientation of the transmitted radiation pattern with respect to the crop and the angle of incidence of the transmitted radiation pattern on the various portions of the crop edge. The spacing between the lines parallel to the crop edge top could be used to identify the exact crop edge.

In step S106, the data processor 116 identifies coordinate data in the collected image associated with the detected crop edge. Step S106 is more fully described in conjunction with the method FIG. 2 and the same description applies equally to FIG. 3, as if fully set forth here.

Figure 4:
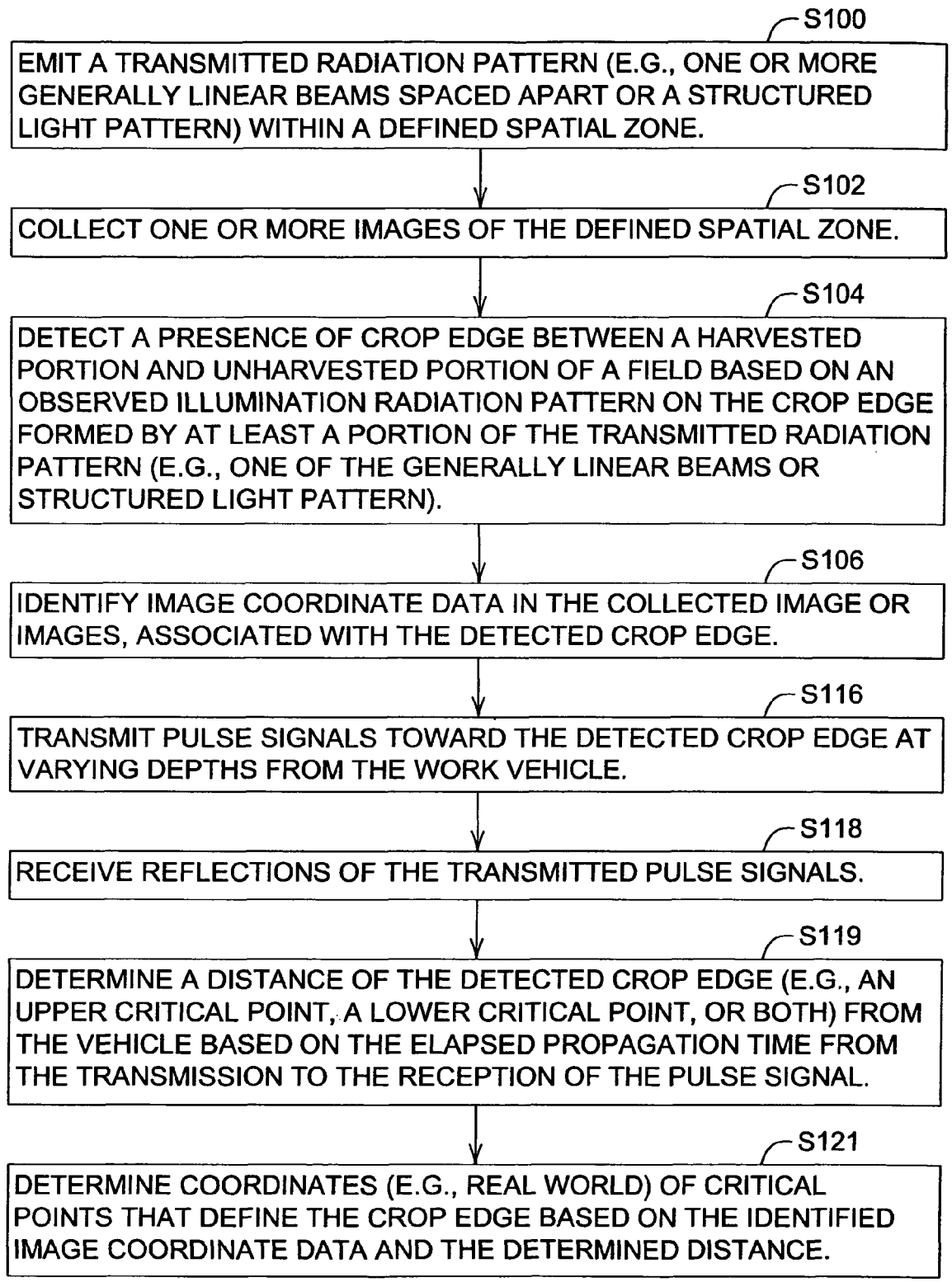
FIG. 4 is an embodiment of a method for identifying a crop edge in accordance with a structured light mode and a range-finding mode.

The method of FIG. 4 is similar to the method of FIG. 2, except the method of FIG. 4 includes additional steps S116, S118, S119, and S121. Like reference numbers in FIG. 2 and FIG. 4 indicate like steps or procedures. The method of FIG. 4 uses a broad radiation pattern in a structured light mode to generally locate the crop edge (in steps S100 through S106). The method of FIG. 4 uses a refined radiation pattern (e.g., targeted beams) in a range-finding mode to identify accurately the depth or three dimensional location of crop edges in an efficient manner (in steps S116 through S121). The structured-light mode of FIG. 4 has been previously described in conjunction with FIG. 2. The range-finding mode of FIG. 4 begins in step S116 following the structured light mode.

In step S116, a transmitter 105 transmits one or more pulse signals toward the detected crop edge at one or more depths (e.g., varying depths) from the work vehicle. Each pulse may be identifiable or distinguishable from other pulses with pulse width modulation, pulse code modulation, different pulse frequencies, or any other suitable modulation scheme. In pulse width modulation, the duration of the pulse is varied such that each pulse can be distinguished from other pulses by its temporal length (e.g., when received within a certain time interval after transmission). The transmitter 105 cooperates with the timer 118 to record the transmission time corresponding to each pulse.

In one embodiment, the transmission is directed toward the crop edge or in a region around the crop edge (as identified earlier in step S104 and step S106) to reduce the time and processing burden on the data processor 116. The transmitter 105 does not need to scan the entire field of view because the micro-mirror array 104 supports random access to any available radiation pattern and orientation thereof. The angular orientation of the transmitter 105 and the height above ground is known.

In step S118, a receiver 107 receives reflections of one or more of the transmitted pulse signals. The receiver 107 records the reception time corresponding to each identifiable or distinguishable pulse. The receiver 107 has a detector 112 for decoding pulse width modulation, or pulse code modulation, different pulse frequencies or another modulation scheme that makes the pulses identifiable.

In step S119, a data processor 116 determines a distance of the detected crop edge (or critical points thereon) from the vehicle based on the elapsed propagation time from the transmission time to the reception time of each identifiable pulse signal. The elapsed propagation time is proportional to a distance of the point on the crop edge from the work vehicle. The magnitude of the received reflection may depend upon the density of the crop, the color of the crop, and the wavelength or frequency of the transmitted pulse. The transmitter position (e.g., three dimensional transmitter coordinates) of the transmitter 105, the receiver position (e.g., three dimensional receiver coordinates) of the receiver 107, and the elapsed propagation time may be applied to geometric or trigonometric equations to determine the distance or depth of (1) critical points of the crop edge, (2) critical points on the upper interface of the crop edge, (3) critical points on the lower interface of the crop edge, (4) or all of the foregoing items.

In step S121, the data processor 116 determines coordinates (e.g., real world) coordinates of critical points that define the crop edge based on the identified image coordinate data and the determined distance or depth data. For example, the data processor 116 determines the actual coordinates based on the identified image coordinate data of step S106 (e.g., for x, y real-world coordinates of critical points associated with the crop edge) and the determined distance of step S119 (e.g., for z real-world coordinates of critical points).

Figure 5:
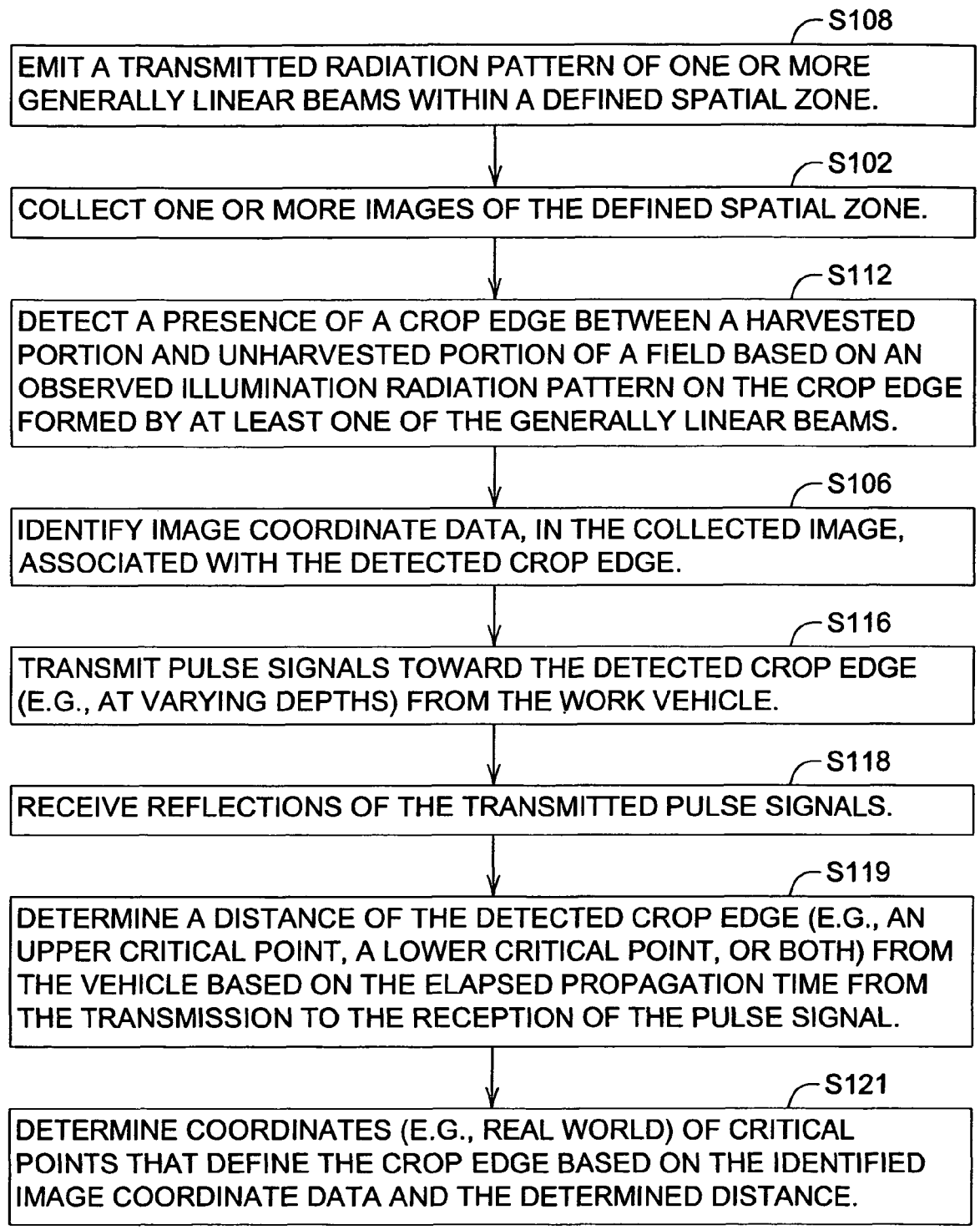
FIG. 5 is another embodiment of a method for identifying a crop edge in accordance with a structured light mode and a range-finding mode.

The method of FIG. 5 is similar to the method of FIG. 3, except the method of FIG. 5 further includes step S116 through step S121. Like reference numbers in FIG. 2, FIG. 4 and FIG. 5 indicate like steps or procedures.

The method of FIG. 5 uses a broad radiation pattern in a structured light mode to generally locate the crop edge (in steps S108, S102, S112, and S106). The method of FIG. 5 uses a refined radiation pattern (e.g., targeted beams) in a range-finding mode to identify accurately the depth or three dimensional location of crop edges in an efficient manner (in steps S116 through S121). The explanation here begins with the range-finding mode because the structured light mode was previously discussed.

In step S116, a transmitter 105 transmits one or more pulse signals toward the detected crop edge at one or more depths (e.g., varying depths) from the work vehicle. Each pulse may be identifiable or distinguishable from other pulses with pulse width modulation, pulse code modulation, different pulse frequencies, or any other suitable modulation scheme. In pulse width modulation, the duration of the pulse is varied such that each pulse can be distinguished from other pulses by its temporal length. The transmitter 105 cooperates with the timer 118 to record the transmission time corresponding to each pulse.

In one embodiment, the transmission is directed toward the crop edge or in a region around the crop edge (as performed in step S112 and/or step S106) to reduce the time and processing burden on the data processor 116. The transmitter 105 does not need to scan the entire field of view because the micro-mirror array 104 supports random access to any available radiation pattern and orientation thereof. The angular orientation of the transmitter 105 and the height above ground is known.

In step S118, a receiver 107 receives reflections of one or more of the transmitted pulse signals. The receiver 107 records the reception time corresponding to each identifiable or distinguishable pulse. The receiver 107 has a detector 112 for decoding pulse width modulation, or pulse code modulation, different pulse frequencies or another modulation scheme that makes the pulses identifiable.

In step S119, a data processor 116 determines a distance of the detected crop edge (or critical points) from the vehicle based on the elapsed propagation time from the transmission time to the reception time of each identifiable pulse signal. The elapsed propagation time is proportional to a distance of the point on the crop edge from the work vehicle. The magnitude of the received reflection may depend upon the density of the crop, the color of the crop and the wavelength or frequency of the transmitted pulse. The transmitter position (e.g., three dimensional transmitter coordinates) of the transmitter 105, the receiver position (e.g., three dimensional receiver coordinates) of the receiver 107, and the elapsed propagation time may be applied to geometric or trigonometric equations to determine the distance or depth of (1) critical points of the crop edge, (2) critical points on the upper interface of the crop edge, (3) critical points on the lower interface of the crop edge, (4) or all of the foregoing items.

In step S121, the data processor 116 determines coordinates (e.g., real world) coordinates of critical points that define the crop edge based on the identified image coordinate data and the determined distance or depth data. For example, the data processor 116 determines the actual coordinates based on the identified image coordinate data of step S106 (e.g., for x, y real-world coordinates of critical points associated with the crop edge) and the determined distance of step S119 (e.g., for z real-world coordinates of critical points associated with the crop edge).

Figure 6:
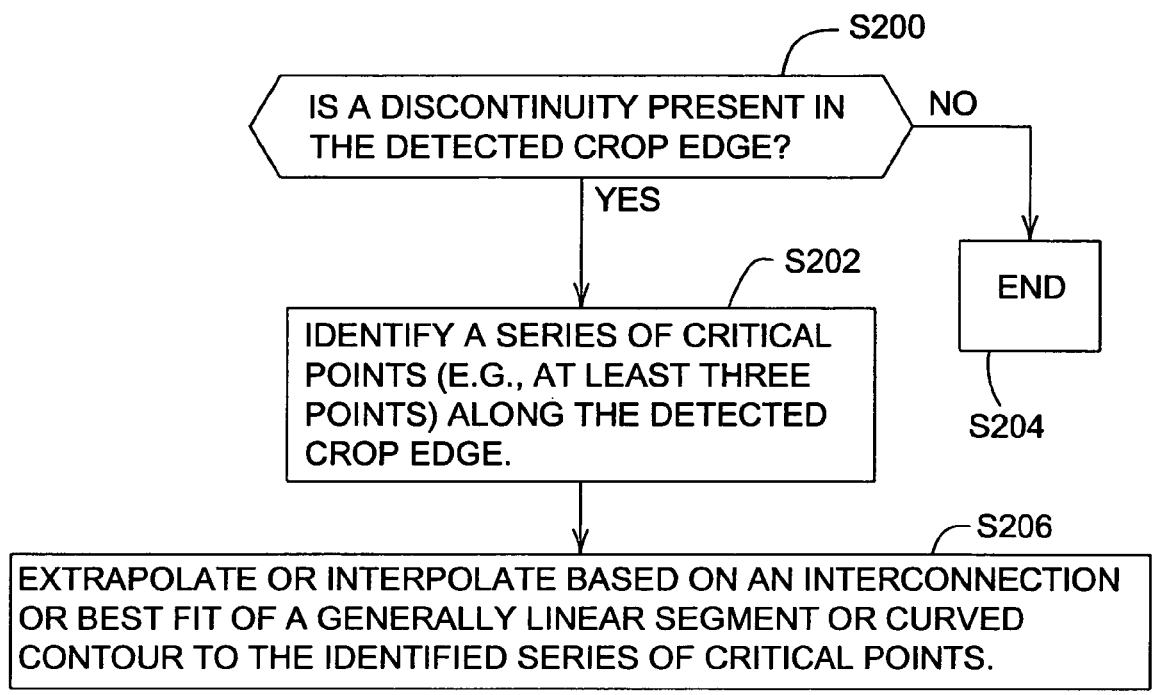
FIG. 6 is a flow chart of a procedure for managing a discontinuity in the crop edge.

FIG. 6 is a flow chart of a method that may supplement the method of FIG. 4 or FIG. 5, or any other embodiments disclosed herein. The method of FIG. 6 applies after step S121 of FIG. 4 or FIG. 5.

In step S200, a data processor 116 determines if there is a discontinuity present in an actual crop edge. A discontinuity is present, if a material portion of an actual crop edge is missing in image coordinate space or in real world coordinate space. In one example, the standard of materiality for a material portion of a discontinuity may be defined first in real world coordinate space and then translated to image coordinate space. In another example, the standard of materiality for a discontinuity is known by empirical data gathered from systems 101 during actual use. If a discontinuity is present in the actual crop edge, the method continues with step S202. However, if there is no discontinuity present, the method ends in step S204.

In step S202, the data processor 116 identifies a series of points (e.g., at least three points) along the crop edge. For example, the series of points comprises a group of critical points associated with the upper interface or a series of points associated with the lower interface. The crop height of the crop may be used to distinguish the upper interface from the lower interface. The crop height may depend upon the type of crop, the variety of crop, and the planting date, for example. The crop height may be manually entered into the data processor 116 via a user interface, or otherwise made available to the data processor 116. The series of points may lie on a trailing region closer to the vehicle than the discontinuity in the crop edge and a leading region is farther away from the vehicle than the discontinuity. The directed attention or random access scanning feature of the micro-mirror array 104 is well-suited for jumping ahead or upfield rapidly from the trailing region to the leading region to support virtual reconstruction of the missing or discontinuous crop edge.

Figure 12:
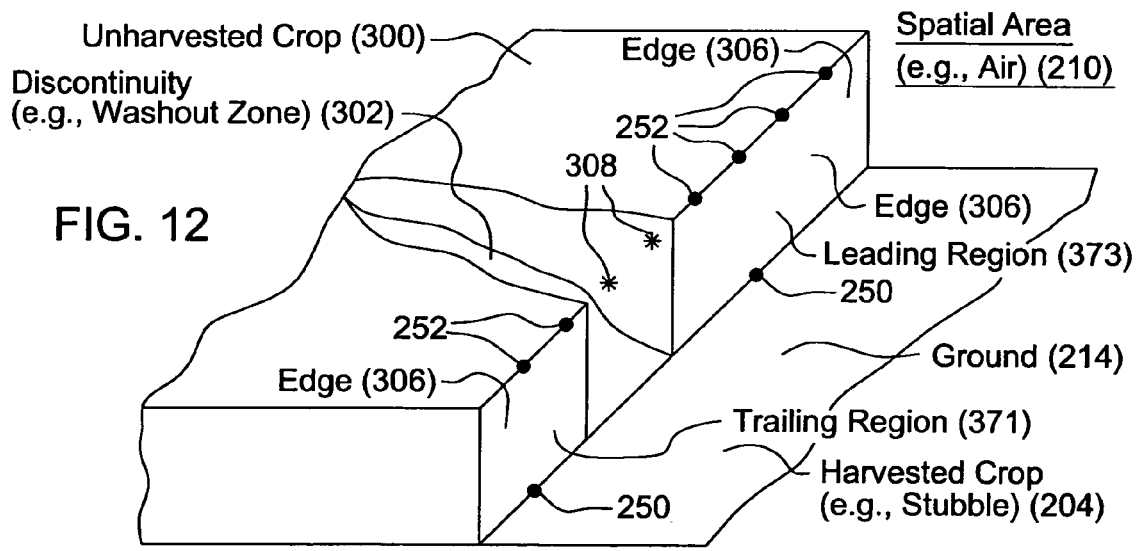
FIG. 12 is a perspective view of a field that has a discontinuity in the crop edge.
Figure 13:
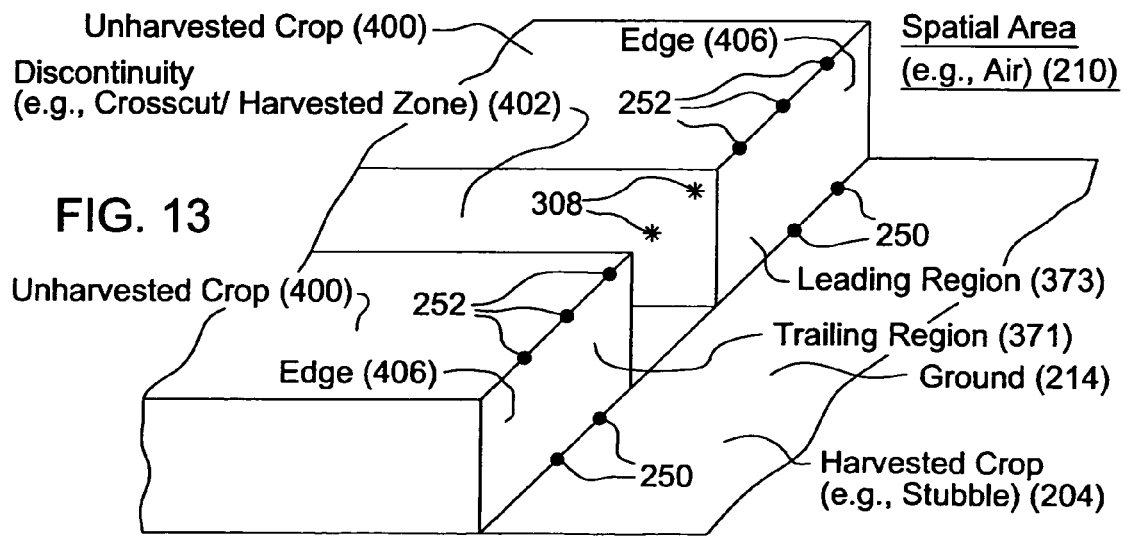
FIG. 13 is a perspective view of a field that has a cross-cut harvest swath or other similar discontinuity in the crop edge.

In step S206, the data processor 116 engages in a data extrapolation or interpolation process. The data extrapolation is based on an interconnection or best fit of a generally linear segment or curved contour to fit the series of points of step S202. The extrapolation process facilitates accurate guidance of the work vehicle (e.g., combine or harvester) despite variations in the unharvested crop from wind damage, hail damage, other weather-related damages or previous cross-cut swaths of the work vehicle across the field. For example, the series of points from the trailing region and the leading region are interconnected to form a virtual reconstruction of the crop edge or virtual crop edge in the area of the discontinuity. FIG. 12 and FIG. 13 illustrate the presence of the discontinuity to which the method FIG. 6 applied. FIG. 12 and FIG. 13 are described later in detail.

FIG. 7 illustrates a crop edge 202 at an interface between a harvested crop 204 and an unharvested crop 200. As used herein, a harvested crop portion shall be synonymous with a harvested crop 204; unharvested crop portion shall be synonymous with an unharvested crop 200. Although the harvested crop 204 may be organized in rows, it is modeled or illustrated in FIG. 7 as a generally solid volume with a height equal to that of the average height or maximum height of the crop canopy for illustrative purposes.

A first side 206 of the crop is generally parallel to the direction of travel of the work vehicle, where a second side 207 of the crop is generally perpendicular or transverse to the direction of travel of the work vehicle. The first side 206 is a generally vertical wall-like structure. In general, the second side 207 of the crop may represent a crop edge where the second side 207 is adjacent to a harvested perimeter portion of a rectangular field, for example. In addition to the foregoing definition of the second side 207, the second side 207 may be defined, but need not be defined, to include the fully standing crop immediately in front of or within a limited zone in front of the header of a combine or harvester.

In FIG. 7, the transmitter 105 directs the transmitted radiation pattern 205 (illustrated by dashed lines) at the second side 207 associated with the crop edge 202. For example, the transmitter 105 may direct the transmitted radiation pattern 205 toward the crop in a lateral region forward with respect to one side of the vehicle to a certain maximum distance (in front of the heading of the vehicle) based on an actual or maximum vehicle speed or velocity (and acceleration). Although the transmitted radiation pattern 205 strikes the upper interface 278 and lower interface 276 of second side 207 as shown in FIG. 7, other alignments of the radiation pattern 205 are possible and fall within the scope of the invention and appended claims. For example, in the general case the transmitter 105 may direct the transmitted radiation pattern 205 to strike one or more of the following: (1) the upper interface 278, where the first side 206 of the unharvested crop 200 meets the spatial area 210 above the unharvested crop 200, (2) the upper interface 278, where the second side 207 of the unharvested crop 200 meets the spatial area 210 above the unharvested crop 200, (3) the lower interface 276, where the first side 206 meets the ground or a top of the harvested crop 204, and (4) the lower interface 276, where the second side 207 meets the ground or top of the harvested crop 204. The transmission of the radiation pattern 205 of FIG. 7 may be carried out in accordance with step S100 of FIG. 2 and FIG. 4 or step S108 of FIG. 3 and FIG. 5, for example.

FIG. 8 shows an illumination radiation pattern 216 (illustrated by dotted lines) or a received reflection that results from transmitting the transmitted radiation pattern 205 of FIG. 7 toward the crop edge 202 at the second side 207. In FIG. 7, the transmitter 105 transmits a series of generally linear segments or strips toward a second side 207 that creates the illumination radiation pattern 216 of FIG. 8. The transmitted light that travels through the spatial area 210 above the crop is not reflected, whereas the illuminated upper line segments 220 or upper critical points of the upper interface 278 are shown as dashed lines. The upper critical points would be present if the transmitted radiation pattern 205 were composed of projected lines, as opposed to projected rectilinear strips as illustrated. The area below the upper interface 278 appears as a rectangular strip or linear illuminated area on the second side 207. The lower interface 276 (or region thereof) may be associated with illuminated lower line segments 218 or lower critical points. The lower critical points would be present if the transmitted radiation pattern were composed of projected lines, as opposed to the projected linear strips as illustrated.

The area below the illuminated lower line segments 218 may be referred to as bent region 208. The bent region 208 is associated with a bent linear segment, an inflection point of the bent linear segment, inflection segments, or an inflection point of the reflection. The illuminated lower line segments 218 are coincident with lower critical points and the lower interface 276.

In FIG. 8, the illumination radiation pattern 216 at the lower interface 276 may show a bend at (1) lower critical points or segments at the intersection of the second side 207 and the ground 214 or (2) lower critical points at the intersection of the second side 207 and the top of the harvested crop 204 (not shown). In FIG. 8, the illumination of local reflection at the upper interface 278 may be associated with no reflection above the top of the crop (in the spatial area (e.g., air) 210) and one or more upper critical points at or below the top of the crop where a reflection or illumination of the crop is apparent. The coordinates of the critical points may be identified in image space and then translated or mapped to real world coordinates.

FIG. 9 is similar to FIG. 7, except FIG. 9 shows generally rectangular or trapezoidal structured light patterns as the transmitted radiation pattern 212, rather than the generally linear segments or strips of the radiation pattern 205 of FIG. 7. Although the transmitted radiation pattern 212 of FIG. 9 is aimed at the first side 206, whereas the transmitted radiation pattern 205 of FIG. 7 is directed at the second side 207, variations of where any transmitted radiation pattern is directed fall within the scope of the invention. Like reference numbers in FIG. 7 and FIG. 9 indicate like elements.

Although as illustrated in FIG. 9, the transmitted radiation pattern 212 is directed toward the upper interface 278, it is understood that the transmitted radiation pattern may be directed toward the lower interface 276, the upper interface 278, or both simultaneously or sequentially. The transmission of the radiation pattern 212 may be executed in accordance with step S106 of FIG. 2 and FIG. 4, for example.

FIG. 10 shows a illumination radiation pattern 220 (as dotted lines) or reflection that results from transmitting the transmitted radiation pattern 212 (e.g., structured light pattern) of FIG. 9 toward the crop edge 202. In FIG. 9 the transmitter 105 transmits the generally rectangular or trapezoidal structured light toward an upper interface 278 between the crop and spatial area 210 above the crop. The structured light that travels through the spatial area 210 above the crop is not reflected, whereas the illuminated segments 222 of the upper interface 278 are shown as dashed lines. The illuminated segments 222 are coincident with one or more critical points along the upper interface 278. The area below the upper interface 278 appears as a rectangular or trapezoidal illuminated area on the first side 206 of the crop edge 202 in the illustrative example of FIG. 10.

The transmitted radiation pattern 212 of FIG. 9 is projected toward a top part of the unharvested crop 200. The illumination radiation pattern 220 of FIG. 10 or reflected radiation pattern will depend upon the physical relationship of the transmitter 105 and the unharvested crop 200. In one example, if the transmitter 105 is positioned below the top of the unharvested crop 200, an upper portion of the transmitted radiation pattern 212 will propagate into space and not be reflected, as shown in FIG. 10. However, in another example, if the transmitter 105 is positioned above the top of the unharvested crop 200, then the illumination radiation pattern (not shown) may comprise a bent region similar to what is observed in FIG. 8, but at or near a top of the crop, rather than at or near the ground as in FIG. 8.

Figure 11:
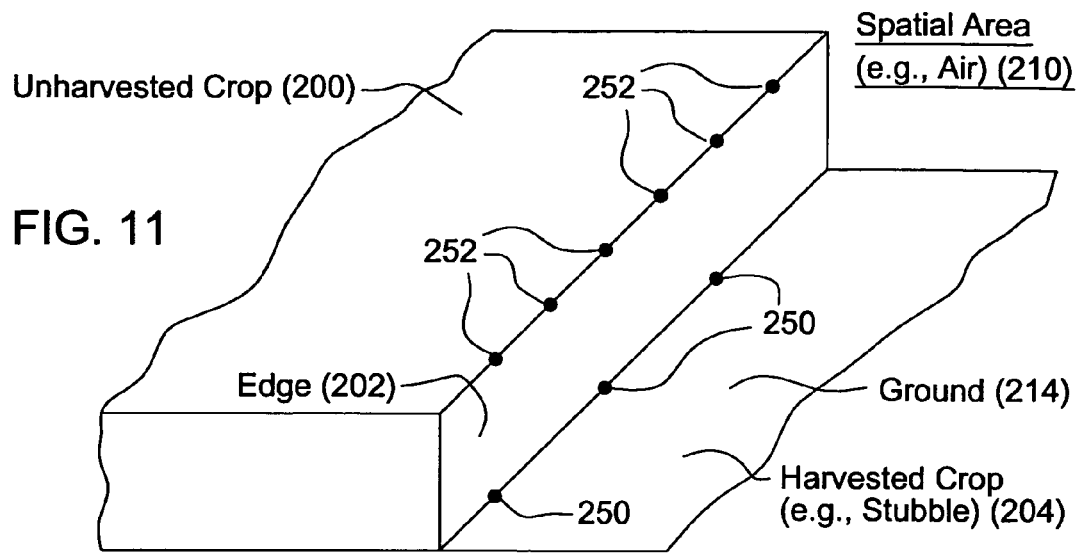
FIG. 11 shows a perspective view of the field showing critical points or scan points along a crop edge.

In FIG. 11, the range-finding or directed depth measurements of the method of FIG. 4 or FIG. 5 (e.g., step S116, S118 and S119) may be directed to critical points. The probing of FIG. 4 or FIG. 5 (e.g., step S100, S102 and S104) may reveal one or more critical points (250, 252) as shown in FIG. 11. The upper critical points 252 lie on the edge 202 of the crop between the spatial area 210 and the top of the unharvested crop 200. The lower critical points 250 lie at or near the bottom of the unharvested crop 200 at the ground-crop interface, for example. The critical points may be joined (e.g., by the nearest neighbor or another approach) to form a plane that defines the crop edge 202. The range-finding mode or directed attention aspect of the system 101 are used to identify the three-dimensional or depth coordinates of each of the lower critical points 250, upper critical points 252, or other critical points. The three-dimensional depth coordinates may be converted or mapped into real world coordinates (e.g., GPS location data).

FIG. 12 and FIG. 13 illustrate how the method of this invention compensates for illustrative discontinuities in the crop edge (e.g., crop edge 306 in FIG. 12 or crop edge 406 of FIG. 13). The method of compensating for the discontinuity in FIG. 6 may be applied here to FIG. 12 and FIG. 13. In FIG. 12, the discontinuity 302 in crop edge 306 may be caused by a physical damage, a washout, wind damage, moisture damage, weather damage, pest damage, insecticide damage, or other environmental or growing conditions. Accordingly, a gap or discontinuity 302 is present in the crop edge 306 that could potentially lead to misguiding of the work vehicle. The system 101 is able to have a sufficient look-ahead or leading region 373 such that the critical points (250, 252) associated with a trailing region 371 may be associated with corresponding critical points of the leading region 373. The trailing region critical points and leading region critical points may be used to extrapolate or estimate missing points caused by missing or damage to the crop edge 306. The extrapolated or interpolated critical points 308 are shown as asterisks in FIG. 12.

FIG. 13 is similar to the example of FIG. 12, except the missing crop edge or discontinuity 402 in the crop edge 406 of FIG. 13 is caused by a cross-cut harvested run that crosses the present planned path of the work vehicle. Like reference numbers in FIG. 12 and FIG. 13 indicate like elements. The extrapolated or interpolated critical points 308 are shown as asterisks in FIG. 13.

Figure 14:
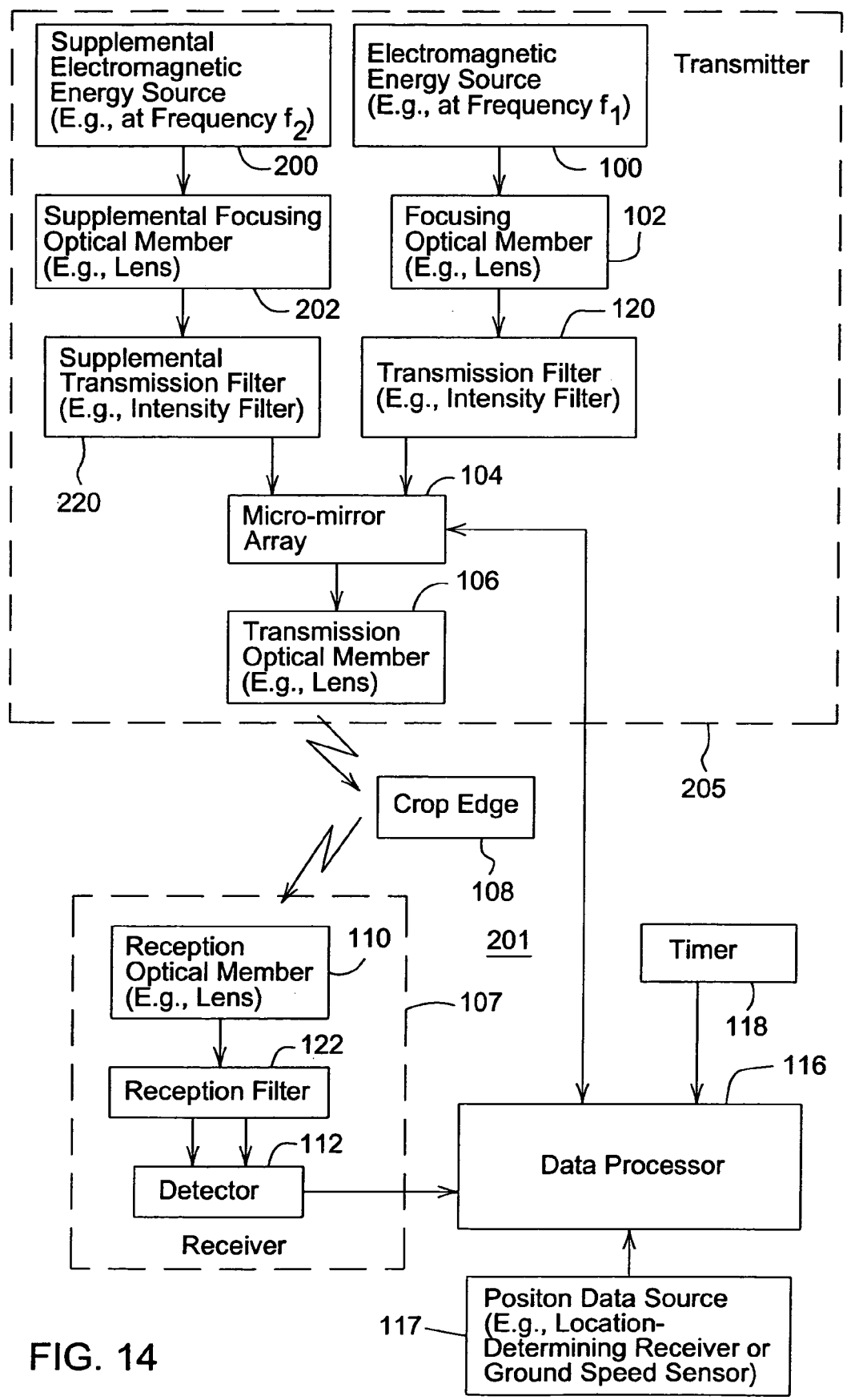
FIG. 14 is an alternate embodiment of a system for identifying an edge of a crop in accordance with the invention.

The edge detection system 201 of FIG. 14 is similar to the edge detection system 101 of FIG. 1, except the transmitter 205 of FIG. 14 includes the following additional components: a supplemental electromagnetic energy source 200, a supplemental focusing optical member 202, and a supplemental transmission filter 220. The supplemental electromagnetic energy source 200 transmits electromagnetic radiation (e.g., light) at a second frequency (designated $F_2$), whereas the electromagnetic energy source 100 transmits electromagnetic radiation at a first frequency (designated $F_1$).

The electromagnetic radiation from the electromagnetic energy source 100 is directed toward a focusing member 102. In turn, the focusing member 102 focuses electromagnetic radiation (e.g., collimated light) to the transmission filter 120. The transmission filter 120 may be turned to pass electromagnetic radiation at the first frequency and to attenuate electromagnetic radiation at other frequencies. The filtered electromagnetic radiation is incident on the micro-mirror array 104.

The electromagnetic radiation from the supplemental electromagnetic energy source 200 is directed toward a supplemental focusing member 202. In turn, the supplemental focusing member 202 provides focused electromagnetic radiation (e.g., collimated electromagnetic radiation) to the supplemental transmission filter 220. The supplemental transmission filter 220 may be tuned to pass electromagnetic radiation at the second frequency and to attenuate electromagnetic radiation at other frequencies.

The filtered electromagnetic radiation from the transmission filter 120 and the supplemental transmission filter 220 provides the micro-mirror array 104 with multiple frequencies of electromagnetic radiation incident thereon. Accordingly, the micro-mirror array 104 may manipulate and reflect the light to form a radiation pattern of structured light wherein different portions (e.g., lines) thereof areas associated with different frequencies of light. When the different frequencies of light are transmitted toward a crop edge or another object, the interactions or reflections from the crop edge may be better observed with greater precision than a single light frequency.

In an alternate embodiment, the transmitter 205 comprises multiple micro-mirror arrays, one corresponding to each frequency transmitted. The multiple micro-mirror arrays avoid the problem of light mixing at or near a single micro-mirror array.

The coordinate data associated with the crop edge may define the crop edge as a series of interconnected points or linear or curved segments. The coordinate data associated with the crop edge may define a planar crop edge boundary in three dimensions, for example. The coordinate data may be used to control the path of the vehicle, the heading of the vehicle, and the speed and heading of the vehicle. The edge detection system and method may communicate with a path planning system, a vehicular guidance system, a vehicular controller to direct the vehicle to track the crop edge or otherwise interact with the crop edge in a defined, planned, or prescribed manner.

Having described the preferred embodiment(s), it will become apparent that various modifications can be made without departing from the scope of the invention as defined in the accompanying claims.

I claim:

1. A method for identifying an edge of a crop, the method comprising:
   emitting a transmitted radiation pattern of structured light within a defined spatial zone toward a top and a bottom of the crop from a mobile vehicle, the transmitted radiation pattern comprising multiple generally linear beams spaced apart from one another;
   collecting one or more images of the defined spatial zone;
   detecting a presence of crop edge between a harvested portion and unharvested portion of a field based on an observed illumination radiation pattern on the crop edge formed by at least a portion of the transmitted radiation pattern, the observed illumination radiation pattern associated with an upper interface and a lower interface; the upper interface defining a boundary between a top of the unharvested crop and the spatial area thereabove, the lower interface defining a boundary between a bottom of the unharvested crop and the ground or between the harvested crop and the ground; and
   identifying image coordinate data, in the collected image, associated with the detected crop edge for guidance of the vehicle, where in a structured light mode the image coordinate data generally locates the crop edge in at least two dimensions and where in a range finding mode the image coordinate data limits the defined spatial zone for subsequent selective gathering of refined three dimensional data for the crop edge.

2. The method according to claim 1 wherein the detecting the presence of the crop edge comprises estimating raw locations of the crop edge, and wherein the identifying image coordinate data comprises applying time of propagation measurements to confirm or refine the raw locations for the crop edge.

3. The method according to claim 1 wherein the linear beams are arranged in a generally vertical manner.

4. The method according to claim 1 wherein the transmitted radiation pattern further comprises one of the following: a generally rectangular radiation pattern and a generally trapezoidal radiation pattern.

5. The method according to claim 1 wherein the defined spatial zone comprises a region that contains a harvested portion and an unharvested portion of the crop in a direction of travel in front of and lateral to a work vehicle.

6. The method according to claim 1 wherein the observed illumination comprises a reflective transition defined by a bent linear segment at the lower interface.

7. The method according to claim 6 wherein the bent linear segment has an inflection point, the inflection point indicating a lower critical point associated with the lower interface.

8. The method according to claim 1 wherein an upper interface of the unharvested crop is bounded by a first region with no observable reflection or projection of an illuminated image on the crop from the transmitted radiation pattern and bounded by a second region adjacent to the first region, the second region having at the least one of a reflected upper segment and an upper critical point from the transmitted radiation pattern.

9. The method according to claim 1 further comprising:
   transmitting pulse signals at a transmission time toward the detected crop edge at varying depths from the work vehicle;
   receiving one or more reflections of the transmitted pulse signals at a reception time;
   determining a distance of the detected crop edge from the vehicle based on the elapsed propagation time from the transmission time to the reception time of the pulse signal.

10. The method according to claim 1 further comprising:
    determining real world coordinates of critical points defining the crop edge based on identified image coordinate data and the determined distance between the critical points and a work vehicle.

11. The method according to claim 10 wherein the detected crop edge comprises at least one of upper critical points and lower critical points.

12. The method according to claim 1 further comprising:
    gathering a series of at least three points along the crop edge;
    extrapolating a virtual crop edge where a discontinuity is present in the actual crop edge, the extrapolation based on an interconnection or best fit of a generally linear segment or curved contour to the series of points.

13. The method according to claim 1 wherein:
identifying the image coordinate data further comprises subsequent selective gathering of depth data for the three dimensional data in the range-finding mode.

14. A method for identifying an edge of a crop, the method comprising:
emitting a transmitted radiation pattern of structured light comprising multiple generally linear beams spaced apart from one another within a defined spatial zone toward a top and a bottom of the crop from a mobile vehicle;
collecting one or more images of the defined spatial zone;
detecting a presence of crop edge between a harvested portion and unharvested portion of a field based on an observed illumination radiation pattern on the crop edge formed by at least one of the generally linear beams at an upper interface and a lower interface, the lower interface between the crop and ground, the upper interface between the crop and a spatial area above the crop; and
identifying image coordinate data, in the collected image, associated with the detected crop edge for guidance of the vehicle, where in a structured light mode the image coordinate data generally locates the crop edge in at least two dimensions and where in a range finding mode the image coordinate data limits the defined spatial zone for subsequent selective gathering of refined three dimensional data for the crop edge.

15. The method according to claim 14 wherein the linear beams are arranged in a generally vertical manner.

16. The method according to claim 14 wherein the observed illumination comprises a reflective transition defined by a bent linear segment at the lower interface.

17. The method according to claim 16 wherein the bent linear segment has an inflection point, the inflection point indicating a lower critical point associated with the lower interface.

18. The method according to claim 14 wherein the upper interface of the unharvested crop is bounded by a first region with no observable reflection or projection of an illuminated image on the crop from the transmitted radiation pattern and bounded by a second region adjacent to the first region, the second region having an upper critical point reflected from the transmitted radiation pattern.

19. The method according to claim 14 further comprising:
transmitting pulse signals at a transmission time toward the detected crop edge at varying depths from the work vehicle;
receiving one or more reflections of the transmitted pulse signals at a reception time;
determining a distance of the detected crop edge from the vehicle based on the elapsed propagation time from the transmission time to the reception time of the pulse signal.

20. The method according to claim 14 further comprising:
determining real world coordinates of critical points defining the crop edge based on identified image coordinate data and the determined distance between the critical points and a work vehicle.

21. The method according to claim 20 wherein the detected crop edge comprises at least one of upper critical points and lower critical points.

22. A system for identifying an edge of a crop, the system comprising:
a transmitter for emitting a transmitted radiation pattern within a defined spatial zone toward a top and a bottom of the crop from a mobile vehicle in accordance with a structured light mode or the structured light mode and a range-finding mode, where in the structured light mode the transmitted radiation pattern comprises multiple generally linear beams spaced apart from one another;
a receiver for collecting one or more images of the defined spatial zone;
a data processor for detecting a presence of crop edge between a harvested portion and unharvested portion of a field based on an observed illumination radiation pattern on the crop edge formed by at least a portion of the transmitted radiation pattern, the observed illumination radiation pattern associated with an upper interface and a lower interface; the upper interface defining a boundary between a top of the unharvested portion and the spatial area thereabove, the lower interface defining a boundary between a bottom of the unharvested portion and the ground or between the harvested portion and the ground; and the data processor arranged for identifying image coordinate data, in the collected image, associated with the detected crop edge for guidance of the vehicle, where in a structured light mode the image coordinate data generally locates the crop edge in at least two dimensions and where in a range finding mode the image coordinate data limits the defined spatial zone for subsequent selective gathering of refined three dimensional data for the crop edge.

23. The system according to claim 22 wherein the data processor limits processing to the defined spatial zone found by estimating raw critical point ranges, rather than completing a potentially time-consuming time-of-propagation analysis over the entire field of view.

24. The system according to claim 23 wherein the linear beams are arranged in a generally vertical manner.

25. The system according to claim 22 wherein the transmitted radiation pattern further comprises one of the following: a generally rectangular radiation pattern, a generally trapezoidal radiation pattern, a structured light radiation pattern, a generally circular beam, a generally conical beam, a generally cylindrical beam, and a range-finding radiation pattern.

26. The system according to claim 22 wherein the defined spatial zone comprises a region that contains a harvested portion and an unharvested portion of the crop in a direction of travel in front of and lateral to a work vehicle.

27. The system according to claim 22 wherein the observed illumination comprises a reflective transition defined by a bent linear segment at the lower interface.

28. The system according to claim 27 wherein the bent linear segment has an inflection point, the inflection point indicating a lower critical point associated with the lower interface.

29. The system according to claim 22 wherein an upper interface of the unharvested portion is bounded a first region with no observable reflection or projection of an illuminated image on the crop from the transmitted radiation pattern and bounded by second region adjacent to the first region, the second region having at the least one of a reflected upper segment and an upper critical point from the transmitted radiation pattern.

30. The system according to claim 22 wherein the transmitter is arranged to transmit pulse signals at a transmission time toward the detected crop edge at varying depths from the work vehicle; the receiver is arranged to receive one or more reflections of the transmitted pulse signals at a reception time; the data processor determining a distance of the detected crop edge from the vehicle based on the elapsed time difference between the transmission time and the reception time.

31. The system according to claim 30 wherein the data processor gathers a series of at least three points along the crop edge and extrapolates a virtual crop edge where a discontinuity is present in the actual crop edge, the extrapolation based on an interconnection or best fit of a generally linear segment or curved contour to the series of points.

* * * * *